May 12, 1970 — C. W. AHRENS — 3,511,498
SPRING SUPPORTED MERRY-GO-ROUND TYPE APPARATUS
Filed April 16, 1968 — 2 Sheets-Sheet 1
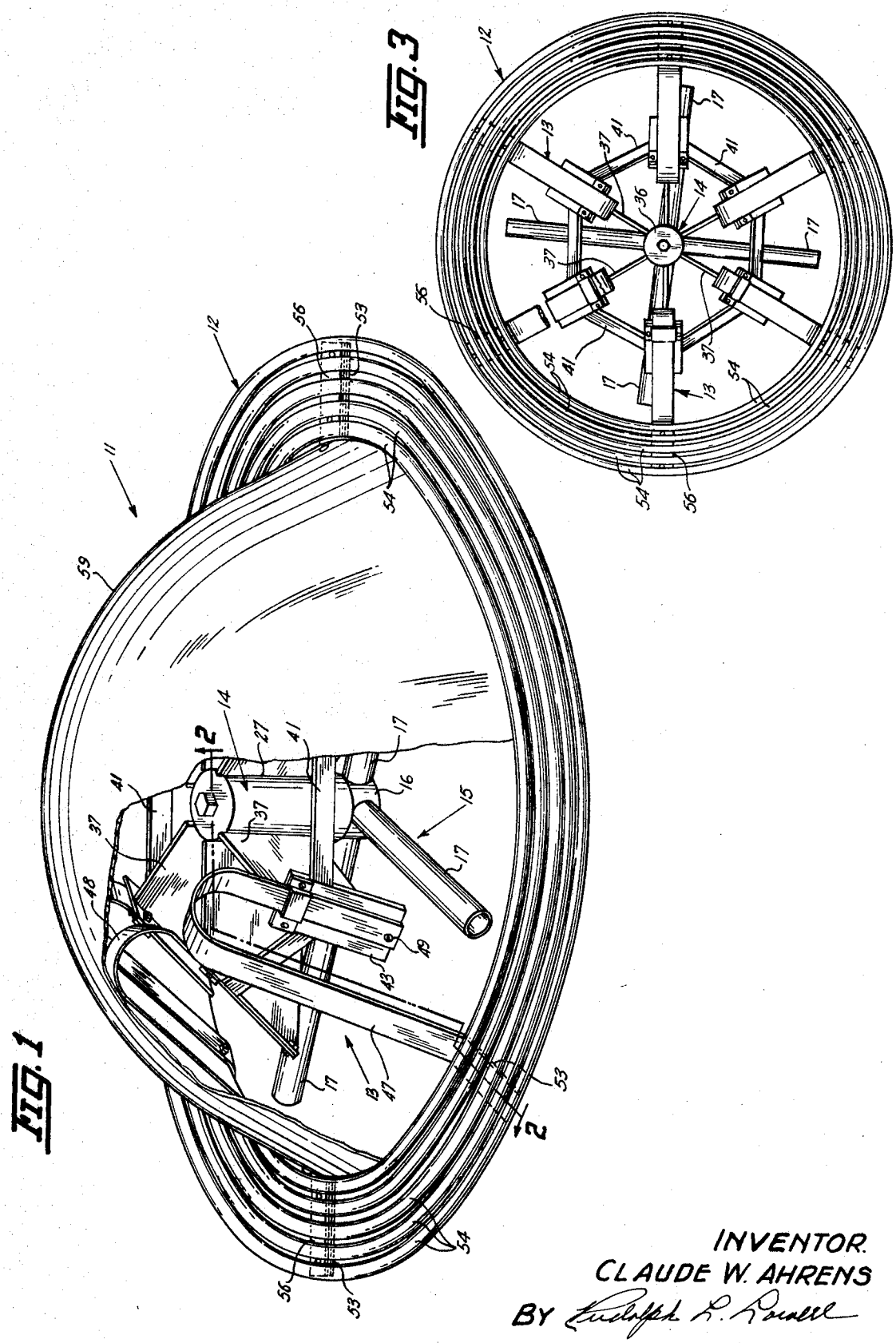
INVENTOR.
CLAUDE W. AHRENS
BY *Rudolph L. Powell*
ATTORNEY.

May 12, 1970  C. W. AHRENS  3,511,498
SPRING SUPPORTED MERRY-GO-ROUND TYPE APPARATUS
Filed April 16, 1968  2 Sheets-Sheet 2
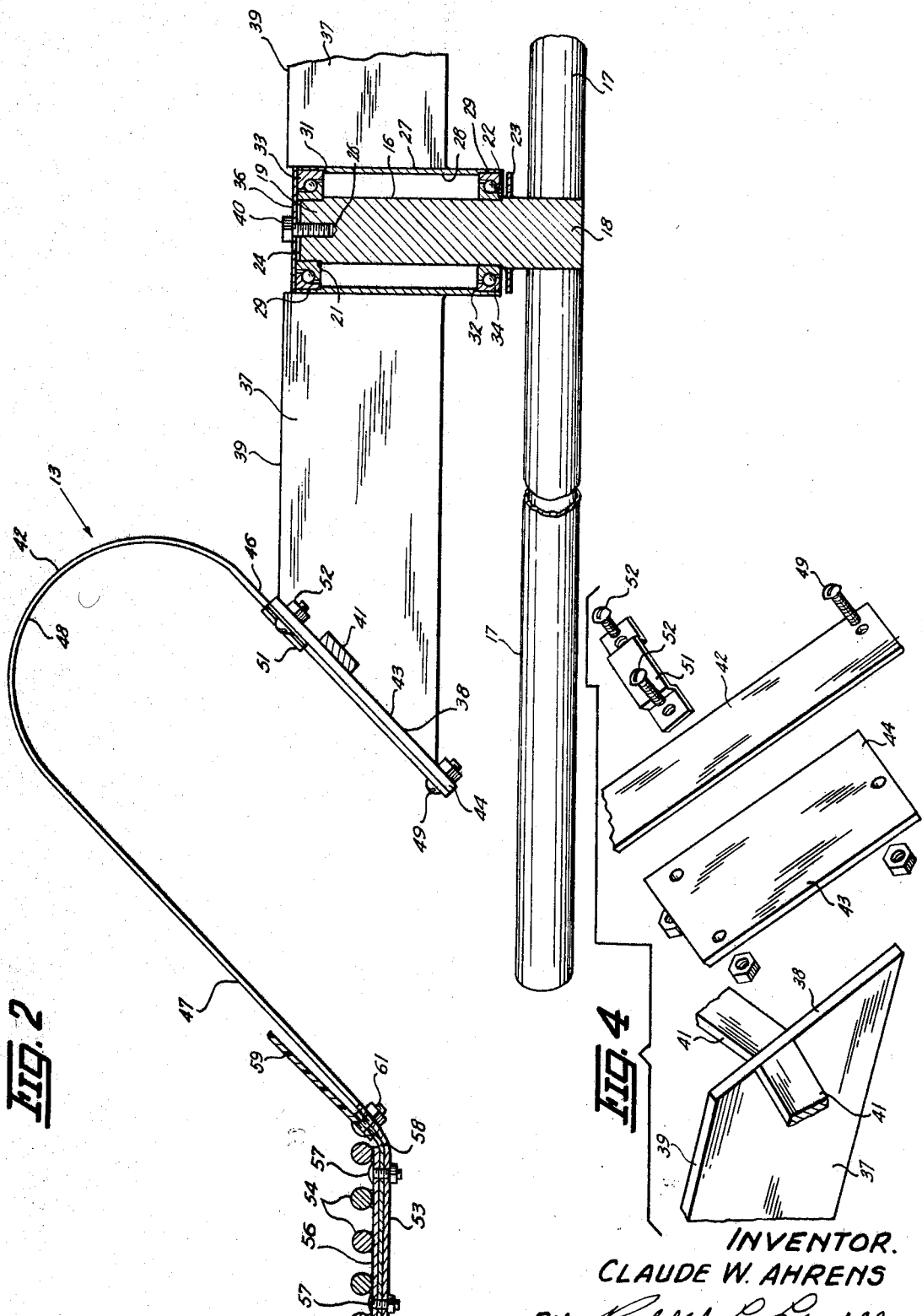
INVENTOR.
CLAUDE W. AHRENS
BY Rudolph L. Lowell
ATTORNEY.

United States Patent Office 3,511,498
Patented May 12, 1970

3,511,498
SPRING SUPPORTED MERRY-GO-ROUND TYPE APPARATUS
Claude Wesley Ahrens, W. Highway 6, Grinnell, Iowa 50112
Filed Apr. 16, 1968, Ser. No. 721,728
Int. Cl. A63g 1/12
U.S. Cl. 272—33       3 Claims

ABSTRACT OF THE DISCLOSURE

The playground apparatus of this invention provides a merry-go-round type structure having a rotatable occupant supporting platform that is spring mounted for horizontal yieldable tilting movement simultaneously with the free rotational movement thereof about a vertical shaft. The vertical shaft is carried on a ground supported base frame and rotatably supports a hub assembly. A plurality of arcuately shaped upwardly bowed flat spring members are circumferentially spaced about the hub assembly and extend radially outwardly therefrom. The outer end portions of the spring members lie in a common horizontal plane and occupant supporting platform is rigidly secured to such outer end portions for rotational movement with the hub assembly and tilting movement relative thereto.

SUMMARY OF THE INVENTION

The invention provides a novel, safe and entertaining playground apparatus for use on school grounds, recreational parks or the like. The apparatus is capable of supporting one or more occupants for rotational and yieldable tiltable movement about a central vertical shaft. The occupants ride on a flat horizontal ring shaped platform which is spring supported on a hub assembly for rotation about the shaft at a speed regulated by the occupants who must periodically dismount to push and rotate the platform. The shifting of the occupants about the platform and their rocking of the platform results in a bouncing non-repetitious rotational ride providing for an unusual degree of entertainment. The hub assembly rotates on a pair of roller bearings that are spaced vertically of the shaft. By virtue of the spring support of the occupant platform, the shock forces, incidental to the tilting of the platform, are counteracted by its spring support so as to appreciably reduce wear and damage to the bearings.

DETAILED DESCRIPTION OF THE INVENTION

Further objects, features and advantages of the invention will become apparent from the following description when taken in connection with the accompanying drawings wherein:

FIG. 1 is a perspective view of the playground apparatus of this invention with parts broken away to more clearly show the construction thereof;

FIG. 2 is an enlarged sectional detail view of the playground apparatus taken along the line 2—2 of FIG. 1;

FIG. 3 is a reduced top plan view of the playground apparatus with a dome cover therefor removed; and FIG. 4 is an exploded perspective detail view of the assembly of the arcuate shaped springs with the hub unit.

Referring to the drawings, the playground apparatus of this invention, indicated generally at 11 in FIG. 1, comprises an occupant supporting platform 12, a spring assembly 13 for mounting the platform 12 on a hub unit 14 and a base frame 15 having an upright shaft 16 on which the hub unit 14 is rotatably supported.

The base frame 15 (FIGS. 2 and 3) includes four ground engaging leg members 17 of a tubular construction positioned at right angles to one another and secured to and radially extended from the lower end portion 18 of the shaft 16. The shaft end portion 18 is of an enlarged diameter and the upper portion 19 of the shaft is of a reduced diameter, so as to form on the shaft axially spaced upper and lower annular shoulders or ledges 21 and 22, respectively. An annular dirt shield 23 is welded about the shaft 16 immediately below the shoulder 22. The upper surface 24 of the shaft 16 is formed with an axially extended threaded bore 26 for a purpose to appear later.

The hub unit 14 (FIG. 2) includes a tubular hub member 27 of a cylindrical shape having its inner peripheral surface 28, at each end of the hub member, formed with an annular recess 29 to provide upper and lower shoulders 31 and 32, respectively. The hub member 27 is positioned in a concentrically spaced relation about the shaft 16. Upper and lower bearing units 33 and 34, respectively, are mounted on the shaft 16 and seated within the recesses 29, so that the upper bearing unit 33 is supported on the shoulders 21 and 31 of the shaft 16 and hub member 27, respectively. The lower bearing unit 34 is carried on the shaft shoulder 22 with the lower shoulder 32 of the hub member 27 resting on the bearing unit 34.

A dirt shield 36 (FIG. 2) of a disc shape having a diameter equal to the outer diameter of the hub member 27, is positioned in a covering relation over the upper end of the hub member, with its lower surface in a clearance relation with the upper bearing unit 33 and the top surface 24 of the shaft 16. A bolt 40 extended through the shield member 36 and threadable within the axial bore 26 in the shaft 16 clamps the shield member 36 against the hub member 27.

The hub unit 14 is thus supported for horizontal rotational movement about the shaft 16. In this rotational movement the hub unit is held against upward movement relative to the shaft 16 by the dirt shield 36, and against downward movement by the seating engagement of the bearing units 33 and 34 on the shoulders 21 and 22, respectively, of the shaft 16.

A plurality of flat upright plate members 37 (FIGS. 1 and 3) are secured by weldments or like means, in a circumferentially spaced relation about the hub member 27, at approximately sixty degree intervals, and extend radially outwardly therefrom. The outer end surface 38 (FIGS. 2 and 4) of each member 37 is inclined upwardly and inwardly at an angle of about forty-five degrees to the horizontal. The top side 39 of a plate member extends horizontally at a position slightly above the upper end of the hub member 27. The outer ends of adjacent plate members 37 are connected together by bars 41 that are spaced below the top sides 39 of the plate members 37.

The spring assembly 13 (FIGS. 1 and 2) is mounted on the plate members 37 of the hub unit 14 and includes a plurality of substantially U-shaped springs 42 formed of a flat spring material and corresponding in number to the plate members 37. Since each spring 42 is similarly assembled with a plate member 37, only one of such assemblies will be described in detail.

Secured to the outer end surface 38 of a plate member 37 (FIGS. 2 and 4) as by weldments or like means, is a flat mounting plate 43 of a rectangular shape. The mounting plate 43 overlies the inclined outer end surface 38 so as to project laterally from opposite sides of the plate member.

The spring 42 has a pair of leg or end sections 46 and 47 connected together by a base section 48, with the leg 47 being a little longer than the leg 46. The leg section 46 of the spring 42 is positioned in a back to back relation with the mounting plate 43 and is secured thereto by means including a bolt assembly 49 extended through the lower section 44 of the mounting plate and through the leg section 46 at a position adjacent its free end.

A clamping bracket 51 located adjacent the upper end of the mounting plate 43 is clamped against the sides of the spring and extended through the bracket 51 and mounting plate 43. With the leg section 46 thus secured to the upright plate 37, it is disposed below spring 42 by bolt assemblies 52 positioned to opposite and in a parallel relation with the leg section 47 so that both leg sections 46 and 47 are inclined to the horizontal at an angle corresponding to the inclination of the end surface 38 of the upright plate member 37. The base section 48 of the spring 42 is thus located adjacent the hub unit 14 so that the leg section 47 projects outwardly from the hub unit.

As best appears in FIG. 2 the leg sections 47 terminate in horizontally extended portions 53 which carry the occupant supporting platform 12. With reference to FIGS. 2 and 3, the occupant supporting platform 12 is illustrated as being comprised of a plurality of concentrically arranged ring members 54 each of which is formed of a round rod material. The ring members 54 are connected together by a plurality of flat connecting members 56 secured, as by weldments, to the ring members 54. The members 56 correspond in number to the springs 42 and are spaced about the ring members so as to be in radial alignment with the horizontal spring portions 53. With the connecting members 56, located below the ring members 54, the supporting platform 12 is positioned on the spring assembly 13 with the connecting members 56 resting on the spring end portions 53. Bolt assemblies 57 extend through the spring end portions 53 and connecting members 56 to rigidly secure the platform 12 to the spring assembly 13. By virtue of the open construction of the platform 12 mud and the like is permitted to fall therethrough so that the platform is self-cleaning.

A fastening clip 58 (FIG. 2) is sandwiched between each connecting member 56 and associated spring end sections 53 to provide a means for anchoring a dome shaped top or guard 59 (FIG. 1) that covers the area within the confines of the platform and prevents children from accidentally falling into the hub unit 14 or spring assembly 13. The dome 59 is connected to the fastening clips 58 by bolt assemblies 61.

It is seen, therefore, that the merry-go-round type apparatus of this invention is capable of supporting one or more occupants on the platform 12 for concurrent yieldable tilting movement and free rotational movement of the platform about the shaft 16. The tilting movement is accomplished by virtue of the spring assembly 13 which acts also to absorb and counteract the shock forces incidental to the tilting of the platform, so as to appreciably reduce the wear on the bearing units 33 and 34.

Although the invention has been described with respect to a preferred embodiment thereof it is to be understood that it is not to be so limited since changes can be made therein which are within the full intended scope of this invention as defined in the appended claims.

I claim:
1. A playground apparatus comprising:
 (a) a base frame,
 (b) an upright shaft secured to and projected upwardly from said base frame,
 (c) a hub unit rotatably supported on said shaft,
 (d) a horizontal occupant supporting platform of a ring shape,
 (e) spring means mounting said platform on said hub unit for rotational and horizontal tilting movement relative to said shaft including a plurality of flat spring members of a substantially U-shape circumferentially spaced about said hub unit, with each spring having a pair of end sections interconnected by a base section, and
 (f) means interconnecting each spring member with said hub unit and occupant supporting platform, so that a first end section is connected to said hub unit and a second end section is connected to said platform, with said first end sections inclined upwardly and inwardly toward said shaft and the second end sections disposed above said first end sections with said base sections located adjacent said shaft.

2. A playground apparatus comprising:
 (a) a base frame,
 (b) an upright shaft secured to and projected upwardly from said base frame,
 (c) a hub unit rotatably supported on said shaft,
 (d) a plurality of arcuate shaped spring members circumferentially spaced about said hub unit, each of which includes a pair of oppositely arranged end sections,
 (e) means securing one of the end sections of each of said spring members to said hub unit so that each of said one end sections is inclined upwardly and inwardly toward said shaft and disposed below a corresponding opposite end section,
 (f) a horizontal occupant supporting ring shaped platform positioned about the terminal ends of said opposite end sections, and
 (g) means securing said platform to said terminal ends.

3. A playground apparatus comprising:
 (a) a base frame,
 (b) an upright shaft secured to and projected upwardly from said base frame,
 (c) a hub unit rotatably supported on said shaft,
 (d) a plurality of arcuate shaped spring members circumferentially spaced about said hub unit, each of which includes a pair of oppositely arranged parallel leg sections, connected together by a base section, one of said leg sections being longer than the other of said leg sections,
 (e) means securing the other one of each said pair of leg sections to said hub unit so that each pair of leg sections is inclined upwardly and inwardly toward said shaft with the base section therebetween adjacent the shaft and the one leg section of each said pair of leg sections disposed above a corresponding other leg section,
 (f) a horizontal ring shaped occupant supporting platform, and
 (g) means securing said platform to the terminal end of each of said one leg sections.

References Cited
UNITED STATES PATENTS

| | | | |
|---|---|---|---|
| 118,599 | 8/1871 | Faulks | 272—33 X |
| 1,426,624 | 8/1922 | Williams | 272—30 |
| 1,866,906 | 7/1932 | Rager | 272—54 |
| 2,688,483 | 9/1954 | Mugler | 272—33 |
| 2,877,827 | 3/1959 | Anderson | 272—39 X |
| 3,075,762 | 1/1963 | Ahrens | 272—39 |
| D. 199,848 | 12/1964 | Doerr. | |

OTHER REFERENCES

Miracle Playground Equipment Catalog #600, copyright 1966, p. 28, Rock 'n' Ride, Grinnell, Iowa 50112.

ANTON O. OECHSLE, Primary Examiner

A. W. KRAMER, Assistant Examiner

U.S. Cl. X.R.
272—40, 46